United States Patent [19]

Valentine

[11] 3,750,775

[45] Aug. 7, 1973

[54] PNEUMATIC SUSPENSION FOR A SNOWMOBILE

[75] Inventor: Louis A. Valentine, Aurora, Colo.

[73] Assignee: Henry L. Valentine, Boulder, Colo.

[22] Filed: Dec. 27, 1971

[21] Appl. No.: 212,116

[52] U.S. Cl............... 180/5 R, 305/24, 305/34
[51] Int. Cl............................................ B62m 27/02
[58] Field of Search................. 305/34, 24; 180/5 R

[56] References Cited
UNITED STATES PATENTS

| 2,652,289 | 9/1953 | Bekker | 305/34 X |
| 3,658,392 | 4/1972 | Perreault | 305/24 |
| 2,867,480 | 1/1959 | Cushman | 305/34 X |
| 3,020,059 | 2/1962 | Allen | 305/34 X |
| 2,652,290 | 9/1953 | Bekker | 305/34 X |

Primary Examiner—Richard J. Johnson
Attorney—Frank C. Lowe

[57] ABSTRACT

Herein disclosed is a pneumatic suspension for the drive track of a snowmobile, mounted between the forward drive wheels and the rearward idler wheels of the snowmobile drive track. This suspension includes an upper framework attached to the snowmobile body between the upper and lower reaches of the drive track, an elongated, resilient, pneumatic bag underneath the framework and longitudinally-extending, articulated track slides underneath the bag supporting the lower reach of the drive track. Each track slide is connected to the forward end of the framework, is turned downwardly from this connection to reach underneath the bag and is connected at its rearward end to the shaft of the idler wheels. The track and bag will yield to provide a smooth ride as the snowmobile travels over uneven terrain.

10 Claims, 12 Drawing Figures

PATENTED AUG 7 1973

INVENTOR.
Louis A. Valentine
BY
Van Valkenburgh & Lowe

ATTORNEY

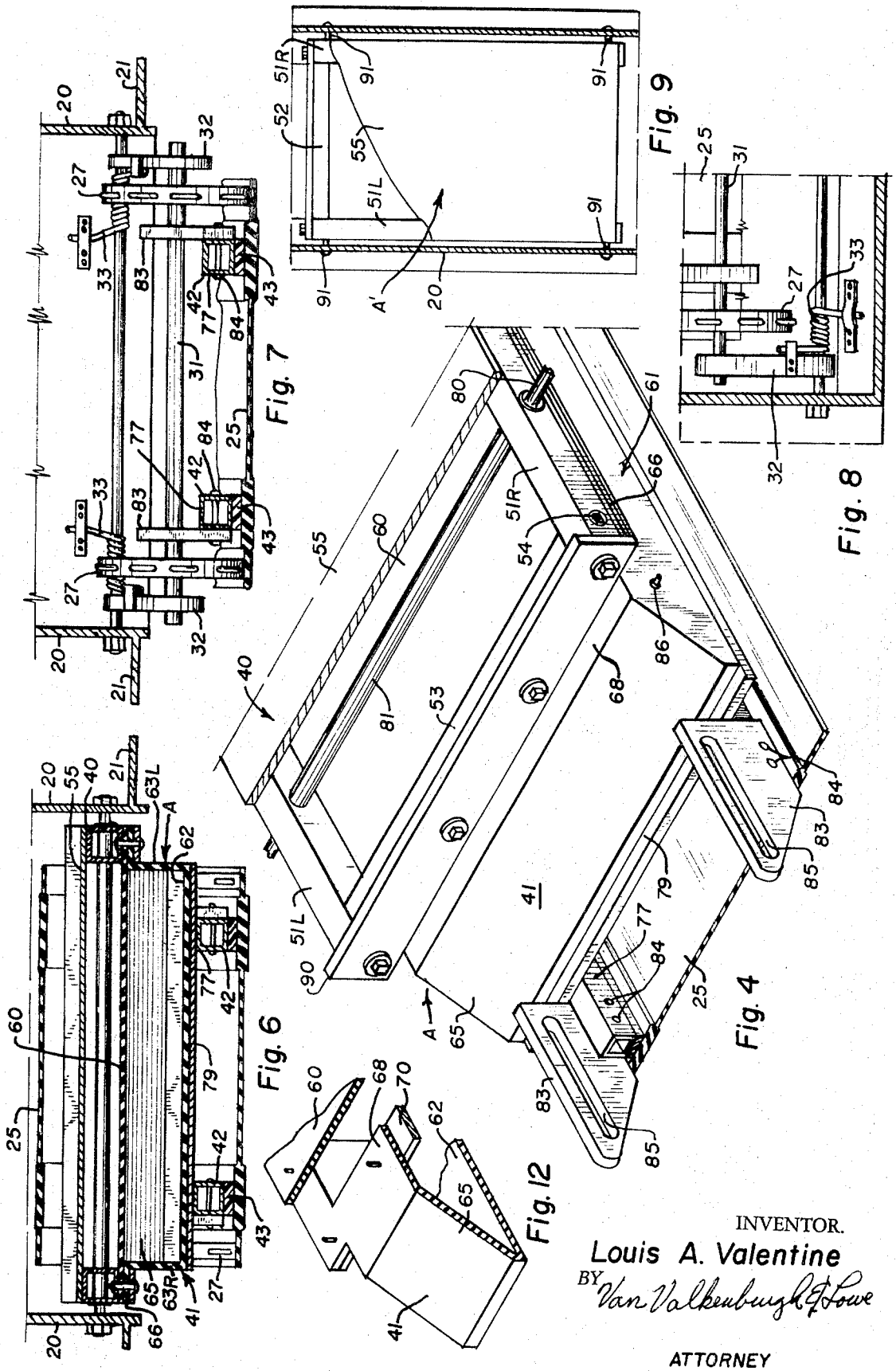

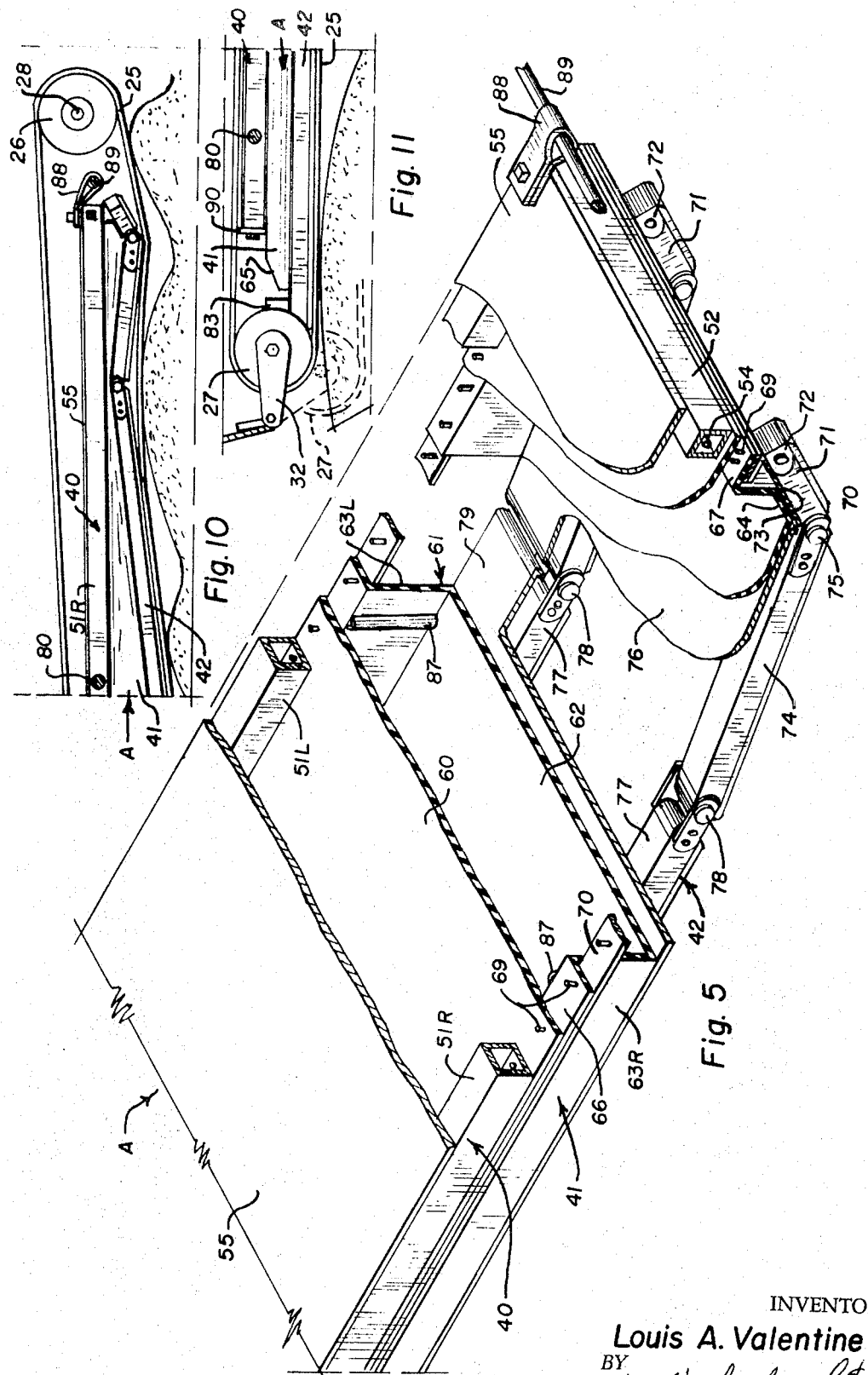

PNEUMATIC SUSPENSION FOR A SNOWMOBILE

This invention relates to powered sleds, commonly called snowmobiles, and more particularly to improvements in the track slide suspensions for snowmobiles, a primary object of the invention being to provide a novel and improved pneumatic suspension for supporting the track slides.

The various types of snowmobiles which are presently being marketed by a number of manufacturers are all similar in their basic arrangements, although they vary somewhat in size, appearance and power output. This basic arrangement includes an elongated body having a cowl-covered engine at the forward end of this body. A passanger section, an elongated seat, is at the rearward section, behind the engine and the controls at the cowl. A pair of ski-like sled runners support the forward end of the snowmobile and these runners rotate and swing to constitute a steering means, controlled by handle bars at the front of the passenger section. The snowmobile is driven by a track, a comparatively wide endless belt which extends underneath the body of the snowmobile behind the runners and is extended about forward drive wheels and rearward idler wheels. The lower reach of the track between the drive and idler wheels is supported by a suspension assembly which lies between the upper and lower reaches of the track. In the conventional snowmobile, the suspension assembly supports track slides or wheels which engage the lower reach of the track. In the present invention, a pneumatic suspension supports track slides and will thus be called a "pneumatic suspension for a snowmobile."

By using lightweight but powerful two cycle engines, a snowmobile is capable of traversing a countryside at surprising speeds, sometimes in excess of forty miles per hour. However, the operation of a snowmobile at such speeds can be hazardous because of irregularities of the snow surface such as hummocks, which are commonly called moguls. Whenever a snowmobile hits a mogul at high speed, the resulting sudden uplift and the subsequent drop will cause the snowmobile to buck, sometimes in a violent manner, and this bucking can cause the operator to lose control of the vehicle. The operator and passengers can even be thrown forwardly over the snowmobile in a manner which can cause an injury.

The present invention was conceived and developed with the above considerations in view because there has been a need to improve the suspension system of a snowmobile to obtain a smoother ride. The invention comprises, in essence, a pneuamtic suspension having an elongated, flexible air-bag which supports an articulated slide track. The slide track will flex against the cushioning support of the elongated bag when the snowmobile traverses moguls and similar hummocks of snow. The invention includes an elongated, flat frame which may be pivoted to the snowmobile frame, a similar, elongated, flexible air-bag underneath the frame and a pair of track slides underneath the bag supporting the lower reach of the track between the drive and the idler wheels. Each track slide is articulated by hinges at selected positions along its reach to yield responsive to pressures under the snowmobile during movement of the snowmobile over uneven terrain. The suspension can also rock upon the pivot connecting the frame to the snowmobile as the track moves over an uneven surface.

It follows that another object of the invention is to provide a novel and improved pneumatic suspension for snowmobile track slides which will minimize the bouncing and bucking action of the snowmobile as it is driven over moguls and other similar irregularities of the snow surface, and thus, provide a smooth, comfortable and safe ride.

Another object of the present invention is to provide a novel and improved pneumatic suspension for snowmobile track slides which is easily mounted upon any of a number of different types and makes of snowmobiles.

Another object of the invention is to provide a novel and improved pneumatic suspension for articulated snowmobile track slides so that forward and rearward portions of the suspension can flex independently of one another to better conform with the irregular snow surfaces traversed by the snowmobile, with resulting better traction, more effective shock absorption when travelling over uneven terrain.

Another object of the invention is to provide a novel and improved pneumatic suspension for snomobile track slides which resiliently yields in such a manner as to help to stabilize the snowmobile against excessive lateral tipping and permit the snowmobile to be operated with a greater degree of safety at high speeds.

Other objects of the invention are to provide a novel and improved pneumatic suspension for snowmobile track slides which is a lightweight, low cost, reliable, rugged and durable unit.

With the foregoing and other objects in view, all of which more fully hereinafter appear, my invention comprises certain constructions, combinations and arrangements of parts and elements as hereinafter described, defined in the appended claims and illustrated in preferred embodiment by the accompanying drawing in which:

FIG. 4 is an isometric view of the rearward portion of the improved pneumatic suspension track slides and a fragment of the drive track, as taken from the indicated arrow 4 at FIG. 3, but on an enlarged scale.

FIG. 5 is an isometric view showing the forward portion of the pneuamtic suspension and the track slide as taken from the indicated arrow 5 at FIG. 3, but on an enlarged scale and with portions broken away to more clearly show the underlying structure otherwise hidden from view.

FIG. 6 is a transverse sectional view as taken from the indicated line 6—6 at FIG. 2, but on an enlarged scale.

FIG. 7 is a transverse sectional view as taken from the indicated line 7—7 at FIG. 2, also on an enlarged scale.

FIG. 8 is a fragmentary sectional detail as taken from the indicated line 8—8 at FIG. 2, but on an enlarged scale.

FIG. 9 is a top plan view similar to FIG. 3, but illustrating, in a somewhat diagrammatic manner, a rigid attachment of the pneumatic suspension for snowmobile track slides of a modified embodiment of the invention.

FIGS. 10 and 11 are fragmentary side elevational views similar to the showing at FIG. 2, and indicating in a somewhat diagrammatic manner, the action of the pneumatic suspension as the snowmobile moves over surface irregularities such as moguls.

FIG. 12 is an isometric view similar to FIG. 4 showing a forward corner of the pneumatic suspension, but with portions broken away to better show the structure thereof.

Figure 1:
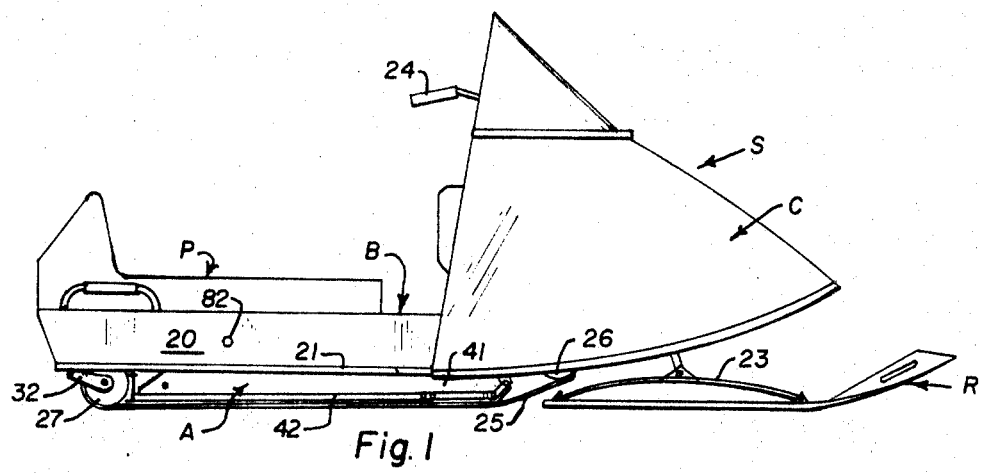
FIG. 1 is a side elevation view of the snowmobile having the improved pneumatic suspension mounted therein.

Referring more particularly to the drawing, the snowmobile S as shown at FIG. 1, consists of an elongated flat body B and a cowl C at the front of the body wherein the engine, gas tank and other controls, not shown, are housed. The body and cowl are plate members which are folded or otherwise formed into a rigid structure. The body portion behind the cowl is the drivers and passengers section and a seating pad P is provided for that purpose.

Figure 3:
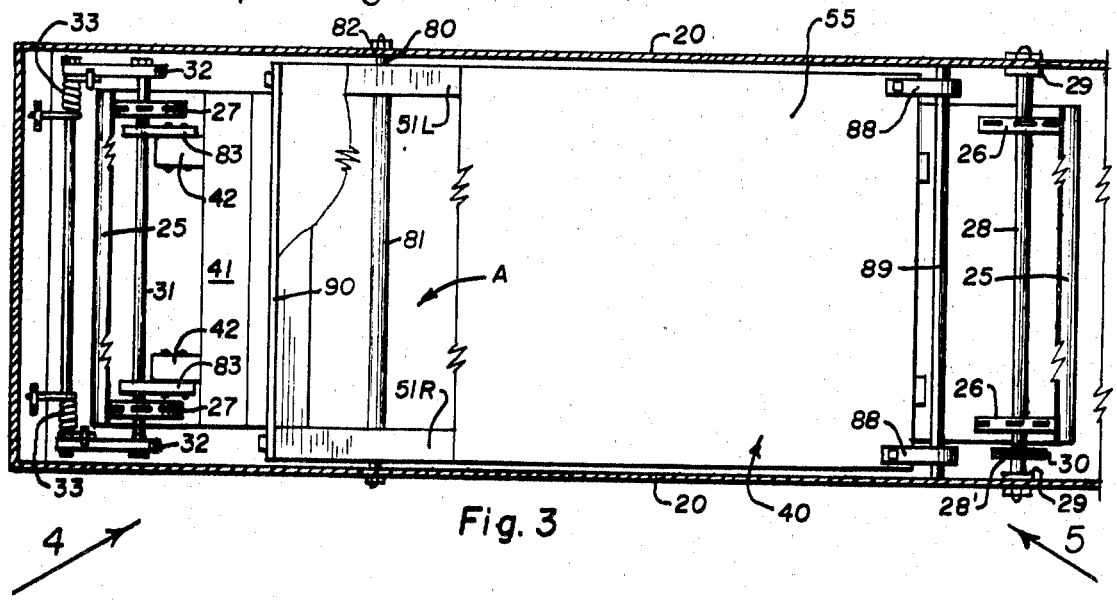
FIG. 3 is a plan view as taken from the indicated line 3—3 at FIG. 2, with portions broken away to better show the underlying structure of the aforesaid pneuamtic suspension.

The body B appears in section as an inverted "U" with side panels 20 and with each having a longitudinally extended foot support 21. Ski runners R are mounted at the front of the snowmobile and carried upon resilient supports 23. The runners R are connected with a steering handle bar 24 at the rear of the cowl C. The construction of the resilient supports and the connection of the handle bars with the runners R is not shown in detail since both are conventional. The drive track 25 extends underneath the body behind the ski runners to support the snowmobile and this track, a comparatively wide endless belt, is stretched between front drive wheels 26, rear idler wheels 27 and the improved pneumatic suspension A lies in the reach between these wheels. The front drive wheels are positioned above the pneumatic suspension A to slope the portion of the track 25 extending to the track slides as illustrated. These front drive wheels are carried upon a shaft 28 secured in bearings 29 mounted upon the body frame. A chain 30 extending from a drive sprocket of the motor within the cowl, not shown, connects with a sprocket 28' on the drive wheel shaft 28 as shown in FIG. 3. The rear idler wheels are carried upon a shaft 31. This shaft is connected to the body by a resilient mount such as rocker arms 32 which are resiliently biased by coil springs 33, as illustrated, to permit the rear wheels to yield to changes in the vertical alignment of the belt supporting the snowmobile. This mechanism also has screws, not shown, to allow adjustment of track tension.

In the typical snowmobile structure above described, the improved pneumatic suspension A is conveniently mounted on the sides of the body between the upper and lower reaches of the drive track to resiliently support the snowmobile upon the lower reach of the track. The pneumatic suspension A is thus a longitudinally extended structure, symmetrical from each side of the longitudinal center plane of the snowmobile and extends from a forward point near the front drive wheels to the rear idler wheels, and is shiftably connected with the shaft 31 of the rear idler wheels. This suspension is preferably mounted to the body of the snowmobile on a transversely disposed pivot rod to rock in a vertical plane, but it may also be rigidly affixed to the body, as hereinafter described.

This suspension assembly A includes essentially three primary components: a rigid, upper frame 40 which is connected to the body of the snowmobile; a resiliently, yieldable air-bag 41 attached to the underside of the frame; and a pair of articulated, longitudinally disposed, spaced track slides 42 attached to the underside of the air-bag and supported by the lower reach of the drive track.

Figure 2:
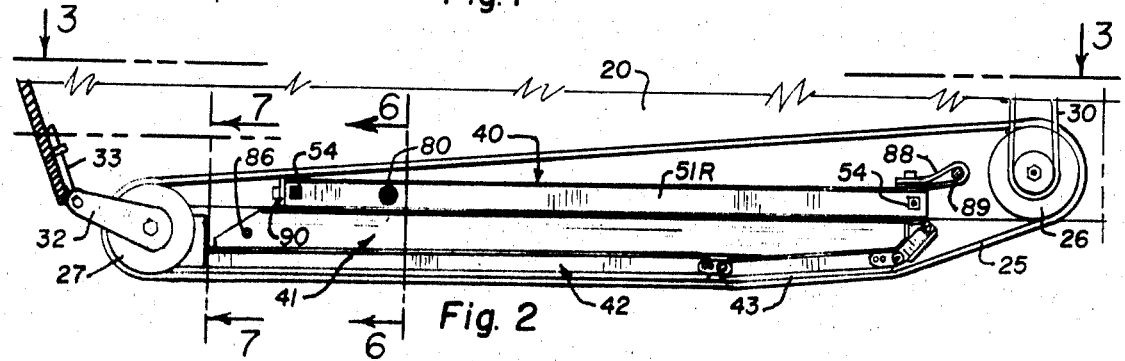
FIG. 2 shows a lower portion of the snowmobile shown at FIG. 1, on an enlarged scale, including a portion of the snowmobile body in section and broken away to better show a side elevational view of the drive track, the track slides and the improved pneumatic suspension therefor.

The frame 40 is essentially a shallow, inverted, rectangular box and it may have a width substantially the same as, or slightly greater than, the width of the track 25 and a length which is slightly less than the other components of the suspension. The sides and end of the frame 40 are formed of square, tubular members, preferably of aluminum to maintain a lightweight structure. The longitudinally disposed tubular sides 51R and 51L are connected with a tubular front end 52 and a tubular rear end 53 in any suitable manner as with bolted rods 54, as shown in FIGS. 2, 4 and 5. The top panel 55, preferably of sheet aluminum, overlies sides, front and rear members and is secured thereto in any suitable manner, as by bolting or welding, such not being shown. It should be noted that the shallow, inverted, box-like frame 40 provides a pocket whereinto the top of the air-bag 41 may flex, as is hereinafter described.

The air-bag 41 is of rubber or a like resilient material which may be molded or otherwise fabricated into a flat, elongated, box-like form which fits between the upper frame 40 and the slide tracks 42. It is to be noted that this air-bag will be inflated to a pressure of only a few pounds per square inch. The bag covers a substantial area, and this low pressure is sufficient to resist the load of the snowmobile and any passengers upon it. Also, if necessary, the rubber bag may be reinforced with fabric more to resist physical abuse to which it may be subjected when it is being used than to reinforce the basic strength of the resilient material from which it is formed.

Preferably this bag is made of two components: a flat sheet 60 at the top which lies against the undersurface of the frame 40 and a flanged, box-like, lower section 61 which includes a floor 62, left and right vertical sidewalls 63R and 63L, a forwardly inclined front wall 64 and a forwardly inclined rear wall 65. This lower section 61 is narrower than the top sheet 60 and side flanges 66 outstand from the top edges of the sidewalls 63R and 63L, to be directly underneath the side edge portions of the top sheet 60. This lower section 61 is also set rearwardly of the front of the top sheet 60 and a forward flange 67 outstands from the top edge of the front wall 64 to be directly underneath the front edge portion of the top sheet 60. The rear wall 65 is rearwardly of the top sheet and a forwardly cover flange 68, extending forwardly from this rear wall 65, lies underneath the rear edge portion of the sheet 60 between the sidewalls 63R and 63L. These flanges merge together at the corners of the lower section, and the flanges and the edge portions of the sheet 60 are joined together and are secured to the undersides of the tubular members 51R, 51L, 52 and 53 in any suitable manner as by bolts or rivets 69 and reinforcing strips 70 at the underside of flanges 66, 67 and 68. The rivets securely and tightly hold the edge portions of the top sheet 60 and the flanges between the frame members and strip 70. A rubber cement may be used to fasten the sheet 60 and the lower section 61 together, if desired.

The floor 62 of the lower section of the bag 41 is supported by the slide tracks 42 and rigid plate members are necessarily interposed between the floor and the slide tracks to support the floor of the air-bag upon the slide tracks 42. The slide tracks 42 are square-sectioned members and may be of steel or aluminum. The undersurface of each slide track, resting against the track 25, is smooth but it may also be provided with an anti-friction strip 43 as illustrated at FIGS. 6 and 7. The front section of each slide track 42 is sloped downward and rearwardly according to a selected configuration which will best permit the track 25 to move underneath them. The undersurface of the bag, the floor 62, is formed to normally assume such configuration as will be described.

The tracks 42 are articulated by using several track sections secured together by hinges to normally conform with this slope, but to yield to varying ground pressures. A first track portion, a short leading track section 71 of each track, is hingedly connected to the underside of the forward flange 67, as by a hinge 72 and the section slopes downwardly and rearwardly against the undersurface of the front end wall 64. A flat plate member 73 extends between the leading track sections 71 to support the sloping front wall of the bag upon these sections.

An intermediate track section 74 of each track is connected to its leading track section by a hinge 75 to extend rearwardly underneath the forward portion of the floor 62 of the bag. Preferably, this section is sloped at a small angle, rearwardly and downwardly, with respect to the upper frame member. A flat, plate member 76 extends between the intermediate track sections 74 to support the forward portion of the floor 62 of the bag upon these sections.

A rear track section 77 of each track is connected to its intermediate track section by a hinge 78 to extend rearwardly and underneath the floor 62 of the bag. The rear sections 77 also extend rearwardly from the bag a short distance for connection with the idler shaft 31 as will be described. A flat plate member 79 extends between the rear track sections 77 to support the floor 62 of the bag which is above these sections.

The upper frame 40 of this pneumatic suspension A is pivotally mounted upon the side panels 20 of the snowmobile by a shaft 80 extending transversely across the upper frame 40 as through a sleeve 81 extending between the side members 51R and 51L. This pivotal mounting was found to best located near the rearward quarter point of the suspension frame as shown at FIGS. 2 and 3. The shaft 80 may be attached to the side panels 20 in any suitable manner, as by bolts 82, which are shown in the drawing as projecting from the outer surface of side panels 20, but which are preferably recessed and flush with these outer surfaces.

To supplement this pivotal mounting of the frame 40, on the shaft 80, the rear ends of the rear track section 77 are slidably connected to the idler shaft 31. Blocks 83 are secured to the track section as by rivets 84 to extend rearwardly therefrom. Horizontal slots 85 are provided in this block through which the shaft 31 extends. With this arrangement, the idler wheels 27 will move vertically in unison with vertical movements of the rear end of the rear track sections 77, but permit these track sections 77 to move short distances towards and away from the shaft 31.

In operating a snowmobile with the pneumatic bag installed, as heretofore described, the bag itself may be filled with air at a selected pressure and it is contemplated that the stiffness of a ride may be varied by varying the pressure within this air-bag. A valve 86 may be provided at any suitable location for this purpose. In any event, the pressures will be quite low, only a few pounds per square inch, and the sidewalls 63R and 63L will normally be sufficiently rigid as to prevent their bulging under air pressure. However, they may be reinforced by stiffeners or struts 87 as shown at FIG. 5. The bag itself is pivoted about the shaft 80 and with this shaft near the rear of the snowmobile, the front portion of the bag can flex or swing upwardly when the snowmobile is moving over rough terrain. To prevent an excessive upward swinging of the pneumatic suspension, a strap loop 88 is provided at each side of the front of the suspension frame 40. The loops are threaded upon a frame bar 89 which extends transversely across the snowmobile to connect with the sidewalls 20 as shown in FIGS. 2 and 3. These straps 88 restrain upward movements of the forward end of the pneumatic suspension as illustrated at FIG. 10.

To complete the organization, it is desirable to provide a means for preventing snow from being pulled onto the top 55 of the upper frame 40 to pile up between this top and the upper return reach of the belt. It was found that a resilient wiper blade 90 could be affixed to the rear, trailing edge of the upper frame 40 to extend upwardly to contact the upper reach of the belt, as in the manner illustrated at FIG. 2.

Operation of this pneumatic suspension is diagrammatically indicated at FIGS. 10 and 11. As the snowmobile travels over rough terrain to contact a hummock or mogul, the forward portion of the pneumatic suspension A is thrust upwardly by the pressure of the hummock against the track 25 and at the same time, the articulated slide track 42 and air-bag 41 deflect to further yield to the pressure created by the hummock, as in the manner shown at FIG. 10. As the snowmobile passes over a hummock or mogul, the forward section of the pneumatic suspension returns to its normal position while the rearward portion of the bag collapses and this rearward portion deflects upwardly along with a deflection of the rear idler wheels. FIG. 11 shows such movement in a somewhat exaggerated manner to exemplify the fact that the rear idler wheels and the rear portion of the slide track flex vertically in unison. The overall result, as amply demonstrated by a testing program, results in a very smooth ride across an undulating snow surface compared with the rides available with conventional snowmobile suspension systems. It is to be noted that the pivotal mounting, the shaft 80, is rearwardly of the rearward quarter point of the suspension. This results in a substantial advantage in the operation of the unit when the snowmobile is starting or climbing a grade because then, the passenger load is also more nearly at the rearward portion of the slide track. This causes compression at the rear portion of the air-bag, but causes the front portion of the air-bag to expand and actually apply a greater pressure to the front of the lower reach of the slide track where increased pressure is needed under such conditions.

A number of variations to the present invention are possible. For example, the pneumatic suspension may be rigidly affixed to the snowmobile frame instead of being pivotally affixed thereto as indicated at FIG. 9, wherein the suspension A' is connected at each corner to the snowmobile side frame members 20 as by bolts 91. Likewise, the previous structure of the bag and the manner in which it may be assembled could be varied considerably within the skill of the artisan to provide a product which will function the same as that hereinabove described. Thus, I have now described my invention in considerable detail, recognizing that others may design and build alternate and equivalent structures which are nevertheless within the spirit and scope of my invention. Hence, I desire that my protection be limited, not by the constructions illustrated and described, but only by the proper scope of the appended claims.

I claim:

1. In combination with a snowmobile or the like mounted upon a continuous, flexible drive track extending between forward and rearward wheels carried by the vehicle, with the track forming a lower and upper reach between the wheels, a pneumatic suspension comprising:
   a. an elongated, enclosed air-bag structure adapted to be mounted between the upper and lower reaches of the track, having an undersurface slidably engaging and being supported upon the lower reach of the track, yieldable sidewalls and a top portion;
   b. attachment means at the top portion engaging the body of the vehicle at the side of the track;
   c. a support plate means at the aforesaid undersurface; and
   d. a matched pair of longitudinally-disposed, articulated slide tracks spaced symmetrically from the center plane of the snowmobile underneath the support plate means.

2. In combination with a snowmobile having a drive track mounted between forward drive wheels and rearward idler wheels, a pneumatic suspension assembly supporting the snowmobile adapted to engage and be supported upon the lower reach of the drive track between the drive and idler wheels, and comprising:
   a. an elongated, longitudinally disposed frame mounted on the snowmobile between the upper and lower reaches of the drive track;
   b. an elongated, longitudinally disposed, resilient, pneumatic bag mounted to the underside of the frame and;
   c. a pair of longitudinally disposed, articulated track slides underneath the pneumatic bag, supported on the upper surface of the lower reach of the drive track and supporting the pneumatic bag, whereby movement of the track slides relative to the frame, as the snowmobile traverses uneven terrain, is cushioned by the resilient support of the pneumatic bag providing a smooth ride for the snowmobile.

3. In the combination defined in claim 2, wherein:
   the pneumatic bag structure includes an enclosed, flat bag formed of resilient, rubber-like sheet material.

4. In the combination described in claim 2, including:
   a rigid planar support plate at the undersurface of the pneumatic bag whereto the slide tracks are mounted.

5. In the combination defined in claim 4, wherein each slide track comprises:
   a forward slide arm pivotally attached to the forward end of the frame means and angled downwardly underneath the leading end of the air-bag structure; and
   a second slide arm pivotally connected at the rear end of each forward slide arm to extend rearwardly therefrom and underneath the aforesaid support plate means.

6. In the combination described in claim 5, including:
   a third slide arm pivotally connected to each second slide arm to extend rearwardly therefrom, in tandem and underneath the rear portion of the air-bag structure; and
   a second support plate underneath the rear portion of the air-bag structure supported by the said third slide arm.

7. In the combination described in claim 6, wherein:
   each said third slide arm is slideably connected at its rearward end to the axle of the rear wheels of the vehicle.

8. In the combination described in claim 2, wherein:
   wall portion of the snowmobile body extend downardly from above the upper ridge of the track at each side of the snowmobile to a position alongside said frame; and
   attachment means connecting the frame to these extended wall portions.

9. In the combination defined in claim 8, wherein said frame comprises:
   an inverted rectangular, open-bottom box with closed sides and ends and a top panel cover.

10. In the combination defined in claim 8, wherein:
    said attachment means is a transverse rod pivotally connecting the said frame to the wall portions of the snowmobile.

* * * * *